United States Patent
Uchihara et al.

(10) Patent No.: US 9,590,515 B2
(45) Date of Patent: Mar. 7, 2017

(54) ELECTRIC POWER CONVERSION APPARATUS AND ELECTRIC POWER CONVERSION METHOD

(71) Applicant: Toyota Jidosha Kabushiki Kaisha, Toyota-shi, Aichi-ken (JP)

(72) Inventors: Masafumi Uchihara, Toyota (JP); Kazuyuki Sasaki, Nagoya (JP); Tomohiro Usami, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/970,920

(22) Filed: Dec. 16, 2015

(65) Prior Publication Data

US 2016/0190944 A1    Jun. 30, 2016

(30) Foreign Application Priority Data

Dec. 26, 2014  (JP) ................................. 2014-266323

(51) Int. Cl.
  *H02M 7/5387*  (2007.01)
  *H02M 3/335*  (2006.01)
  *H02M 1/32*  (2007.01)

(52) U.S. Cl.
  CPC ......... *H02M 3/33546* (2013.01); *H02M 1/32* (2013.01); *H02M 3/33561* (2013.01); *H02M 3/33576* (2013.01); *H02M 3/33584* (2013.01)

(58) Field of Classification Search
  CPC ........ H02M 1/32; H02M 3/325; H02M 3/335; H02M 3/33569; H02M 7/5387;
  (Continued)

(56) References Cited

U.S. PATENT DOCUMENTS 5,625,539 A * 4/1997 Nakata ................ H02M 7/4807
                                                        363/132
7,778,045 B2 * 8/2010 Alexander .......... H02M 3/1582
                                                        363/124
(Continued)

FOREIGN PATENT DOCUMENTS

JP     2007-318849 A    12/2007
JP     2011-193713 A     9/2011
(Continued)

*Primary Examiner* — Adolf Berhane
(74) *Attorney, Agent, or Firm* — Dinsmore & Shohl LLP (57) ABSTRACT

There is provided a electric power conversion method of an electric power conversion apparatus comprising: charging the capacitor by transmitting the electric power from the primary circuit to the secondary circuit; and determining whether a voltage across the capacitor is equal to or greater than a predetermined value; the electric power conversion method further comprising, upon determining that the voltage across the capacitor is greater than or equal to the predetermined value, stopping to drive the primary circuit; driving the first secondary upper arm or the second secondary upper arm; and detecting whether a short-circuiting failure occurs in the first secondary lower arm or in the second secondary lower arm based on a presence or absence of change in a voltage at the secondary port in response to driving the first secondary upper arm or the second secondary upper arm.

16 Claims, 7 Drawing Sheets

(58) Field of Classification Search
CPC .... H02M 7/53871; H02M 7/53; H02M 7/537;
H02M 7/521
USPC ... 363/16, 17, 50, 56.01, 56.02, 97, 98, 131,
363/132
See application file for complete search history.

(56) References Cited

U.S. PATENT DOCUMENTS

| | | | | |
|---|---|---|---|---|
| 2006/0139823 | A1* | 6/2006 | Shoji | H02M 1/34 361/56 |
| 2011/0198933 | A1* | 8/2011 | Ishigaki | B60R 25/00 307/66 |
| 2014/0132066 | A1* | 5/2014 | Hirano | H02M 3/33584 307/17 |
| 2014/0133187 | A1* | 5/2014 | Hirano | H02M 3/33592 363/17 |
| 2014/0233265 | A1* | 8/2014 | Hirano | H02M 3/33576 363/17 |
| 2014/0237280 | A1* | 8/2014 | Muto | G06F 1/3293 713/323 |
| 2015/0085532 | A1* | 3/2015 | Tanahashi | H01F 27/306 363/17 |
| 2015/0229217 | A1* | 8/2015 | Hirano | H02M 3/33507 363/17 |
| 2015/0244278 | A1* | 8/2015 | Hirano | H02M 3/33561 307/24 |
| 2015/0263632 | A1* | 9/2015 | Hirano | H02M 3/33546 363/17 |
| 2015/0263633 | A1 | 9/2015 | Shono et al. | |
| 2015/0291035 | A1* | 10/2015 | Nagashita | B60L 1/00 307/9.1 |
| 2015/0295501 | A1* | 10/2015 | Hirano | H02M 3/3353 363/17 |
| 2015/0295502 | A1* | 10/2015 | Hirano | H02M 1/36 363/17 |
| 2015/0295503 | A1* | 10/2015 | Muto | H02M 3/3353 363/17 |
| 2016/0149503 | A1* | 5/2016 | Usami | H02M 3/33584 363/17 |
| 2016/0152147 | A1* | 6/2016 | Sasaki | B60L 1/00 307/10.1 |
| 2016/0156272 | A1* | 6/2016 | Miura | H02M 3/33561 363/17 |

FOREIGN PATENT DOCUMENTS

| | | |
|---|---|---|
| JP | 2013-150421 A | 8/2013 |
| JP | 2015-173541 A | 10/2015 |

* cited by examiner

ELECTRIC POWER CONVERSION APPARATUS AND ELECTRIC POWER CONVERSION METHOD

CROSS-REFERENCE TO RELATED APPLICATIONS

This application claims priority to Japanese Patent Application No. 2014-266323, filed on Dec. 26, 2014, the entire contents of which are hereby incorporated by reference.

BACKGROUND

1. Field

The present disclosure relates to an electric power conversion apparatus and an electric power conversion method.

2. Description of the Related Art

Conventionally, an electric power conversion apparatus is known, which includes a primary conversion circuit including a plurality of primary ports and a secondary conversion circuit including a plurality of secondary ports, and adjusts, in accordance with the phase difference $\phi$, electric power transmitted between a primary conversion circuit and a secondary conversion circuit which is magnetically coupled with the primary conversion circuit through a transformer (for example, see Patent Document 1).

However, when connecting a high voltage battery upon starting the apparatus, through current may flow through the secondary conversion circuit to cause a failure in the apparatus if a short-circuiting error in the secondary (high-voltage side) conversion circuit cannot be detected.

RELATED ART DOCUMENT

Patent Document

[Patent Document 1] Japanese Laid-open Patent Publication No. 2011-193713

SUMMARY

Some embodiments of the present disclosure detect a short-circuiting failure in the secondary circuit.

In one embodiment, there is provided a electric power conversion method of an electric power conversion apparatus, the electric power conversion apparatus including a primary port provided in a primary circuit, and a secondary port provided in a secondary circuit which is magnetically coupled with the primary circuit through a transformer, the secondary circuit including a first secondary upper arm, a second secondary upper arm, a first secondary lower arm, a second secondary lower arm and a capacitor, wherein electric power to be transmitted between the primary circuit and the secondary circuit is adjusted by changing a phase difference between switching cycle in the primary circuit and switching cycle in the secondary circuit, the electric power conversion method comprising: charging the capacitor by transmitting the electric power from the primary circuit to the secondary circuit; and determining whether a voltage across the capacitor is equal to or greater than a predetermined value; the electric power conversion method further comprising, upon determining that the voltage across the capacitor is greater than or equal to the predetermined value, stopping to drive the primary circuit; driving the first secondary upper arm or the second secondary upper arm; and detecting whether a short-circuiting failure occurs in the first secondary lower arm or in the second secondary lower arm based on a presence or absence of change in a voltage at the secondary port in response to driving the first secondary upper arm or the second secondary upper arm.

In another embodiment, an electric power conversion method of an electric power conversion apparatus is provided. The electric power conversion apparatus includes a primary port provided in a primary circuit, and a secondary port provided in a secondary circuit which is magnetically coupled with the primary circuit through a transformer. The secondary circuit includes a first secondary upper arm, a second secondary upper arm, a first secondary lower arm, a second secondary lower arm and a capacitor. Electric power to be transmitted between the primary circuit and the secondary circuit is adjusted by changing a phase difference between a switching cycle in the primary circuit and a switching cycle in the secondary circuit. The electric power conversion method includes stepping up a voltage at the primary port, charging the capacitor, and determining whether a voltage across the capacitor is greater than or equal to a predetermined value. The electric power conversion method further includes, upon determining that the voltage across the capacitor is greater than or equal to the predetermined value, stopping driving the primary circuit, driving the first secondary upper arm or the second secondary upper arm, and detecting whether a short-circuiting failure occurs in the first secondary lower arm or in the second secondary lower arm based on a presence or absence of change in a voltage at the secondary port in response to driving the first secondary upper arm or the second secondary upper arm.

In yet another embodiment, an electric power conversion apparatus includes a primary circuit including a primary port, a secondary circuit magnetically coupled with the primary circuit through a transformer, and a control unit configured to control electric power transmitted between the primary circuit and the secondary circuit by changing a phase difference between a switching cycle in the primary circuit and a switching cycle in the secondary circuit. The secondary circuit includes a first secondary upper arm, a second secondary upper arm, a first secondary lower arm, a second secondary lower arm, a capacitor and a secondary port. The control unit is configured to: (i) charge the capacitor by transmitting the electric power from the primary circuit to the secondary circuit, (ii) determine whether a voltage across the capacitor is greater than or equal to a predetermined value, and (iii) upon determining that the voltage across the capacitor is greater than or equal to a predetermined value, perform the processes of stopping driving the primary circuit, driving the first secondary upper arm or the second secondary upper arm, and detecting whether a short-circuiting failure occurs in the first secondary lower arm or in the second secondary lower arm based on a presence or absence of change in a voltage at the secondary port in response to driving the first secondary upper arm or the second secondary upper arm.

In yet another embodiment, an electric power conversion apparatus includes a primary circuit including a primary port, a secondary circuit magnetically coupled with the primary circuit through a transformer, and a control unit configured to control electric power transmitted between the primary circuit and the secondary circuit by changing a phase difference between a switching cycle in the primary circuit and a switching cycle in the secondary circuit. The secondary circuit includes a first secondary upper arm, a second secondary upper arm, a first secondary lower arm, a second secondary lower arm, a capacitor and a secondary port. The control unit is configured to: (i) step up an voltage at the primary port, (ii) charge the capacitor, (iii) determine whether a voltage across the capacitor is greater than or equal to a predetermined value, and (iv) upon determining that the voltage across the capacitor is greater than or equal to a predetermined value, perform the processes of stopping driving the primary circuit, driving the first secondary upper arm or the second secondary upper arm, and detecting whether a short-circuiting failure occurs in the first secondary lower arm or in the second secondary lower arm based on a presence or absence of change in a voltage at the secondary port in response to driving the first secondary upper arm or the second secondary upper arm.

Other objects, features and advantages of the present disclosure will become more apparent from the following detailed description when read in conjunction with the accompanying drawings.

DETAILED DESCRIPTION

In the following, embodiments are described in detail with reference to appended drawings. In the respective drawings, identical reference numerals will be applied to the same elements or the like, and descriptions thereof may be omitted.

<Configuration of Electric Power Apparatus 101>

Figure 1:
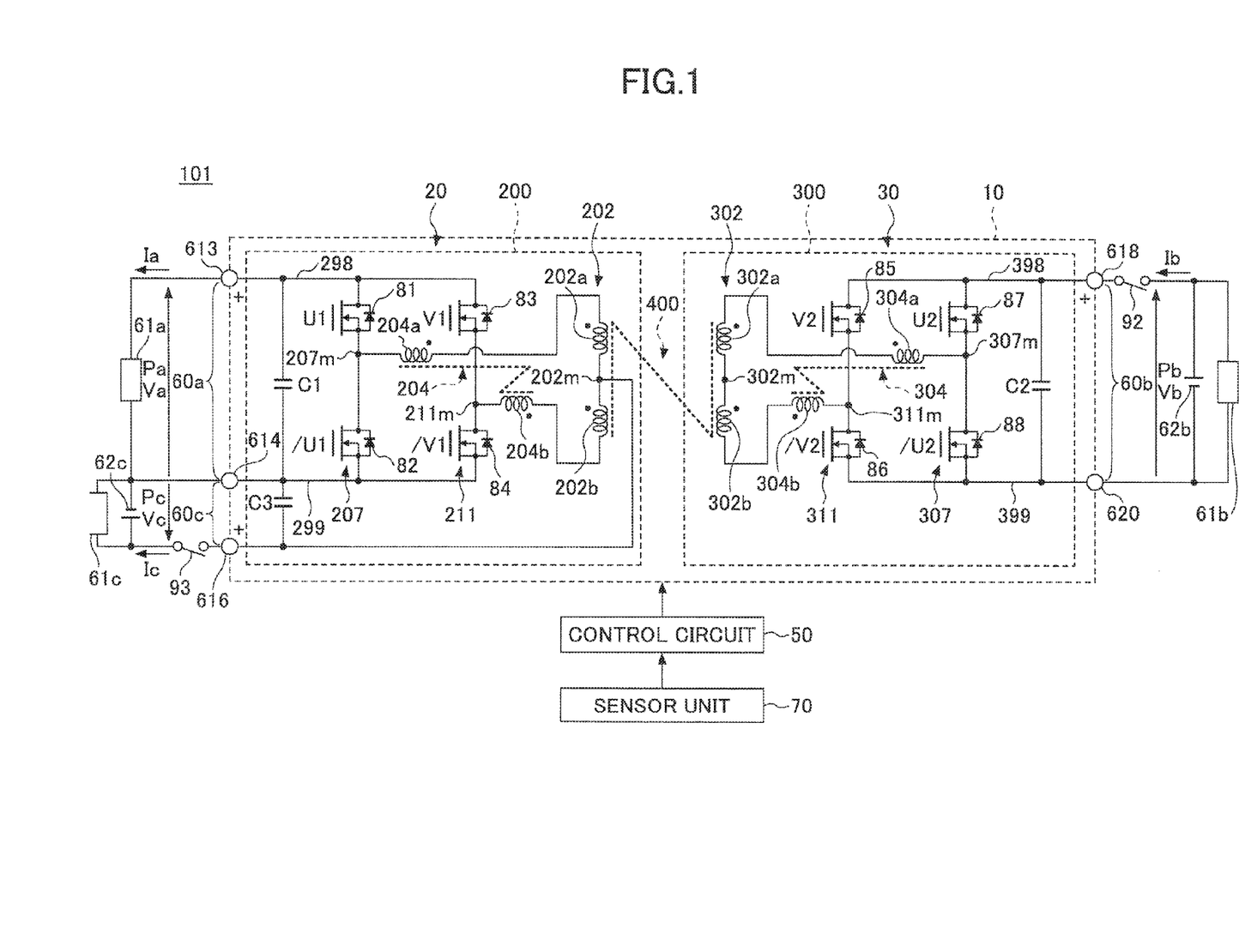
FIG. 1 is a block diagram for illustrating an example configuration of an electric power apparatus that is an embodiment of an electric power conversion apparatus.

FIG. 1 is a block diagram for illustrating an example configuration of an electric power apparatus that is an embodiment of an electric power conversion apparatus. For example, the electric power apparatus 101 is an electric power system including a power source circuit 10, a control unit 50 and a sensor unit 70. For example, the electric power apparatus 101 is installed in a vehicle such as an automobile, and it is for supplying electric power to respective loads installed in the vehicle. A hybrid vehicle, a plug-in hybrid vehicle, an electric vehicle, etc., are exemplified as the vehicle.

For example, the electric power apparatus 101 includes a first input/output port 60a, to which a primary high voltage system load (such as an electric power steering (EPS) system) 61a is connected, and a second input/output port 60c, to which a primary low voltage system load (such as an electronic control unit (ECU) or an electronic control brake system (ECB)) 61c is connected, as primary ports. A primary low voltage system power source 62c (for example, auxiliary battery) feeds the primary low voltage system load 61c which is operated with the same voltage system (for example, 12 V system) as that of the primary low voltage system power source 62c. Also, the primary low voltage system power source 62c supplies the electric power whose voltage is stepped up by a primary conversion circuit 20 of the power source circuit 10 to the primary high voltage system load 61a which is operated with another voltage system (for example, 48 V system that is greater than 12 V system) that is different from that of the primary low voltage system power source 62c. A secondary battery such as a lead battery is exemplified as the primary low voltage system power source 62c.

For example, the electric power apparatus 101 includes a third input/output port 60b, to which a secondary high voltage system load 61b and a secondary high voltage system power source 62b (for example, main battery) are connected, as a secondary port. The secondary high voltage system power source 62b feeds the secondary high voltage system load 61b which is operated with the same voltage system (for example, 288 V system that is greater than 12 V system and 48 V system) as that of the secondary high voltage system power source 62b.

The power source circuit 10 includes three input/output ports as described above, and it has a function for performing the electric power conversion between two input/output ports arbitrarily selected from the three input/output ports. Additionally, the electric power apparatus 101 including the power source circuit 10 may be an apparatus including at least three input/output ports which can perform the electric power conversion between any two input/output ports among the three or more input/output ports.

Port electric powers Pa, Pc and Pb respectively indicate input/output electric powers (input electric power or output electric power) at the first input/output port 60a, at the second input/output port 60c, and at the third input/output port 60b. Port voltages Va, Vc and Vb respectively indicates input/output voltages (input voltage or output voltage) at the first input/output port 60a, at the second input/output port 60c and at the third input/output port 60b. Port currents Ia, Ic and Ib respectively indicate input/output currents (input current or output current) at the first input/output port 60a, at the second input/output port 60c and at the third input/output port 60b.

The power source circuit 10 includes a capacitor C1 disposed at the first input/output port 60a, a capacitor C3 disposed at the second input/output port 60c and a capacitor C2 disposed at the third input/output port 60b. A film condenser, an aluminum electrolytic capacitor, or a polymer solid capacitor, etc., is exemplified as the capacitor C1, C2 or C3.

The capacitor C1 is connected between a terminal 613 at a high-potential side of the first input/output port 60a and a terminal 614 at a low-potential side of the first input/output port 60a and the second input/output port 60c. The capacitor C3 is connected between a terminal 616 at a high-potential side of the second input/output port 60c and a terminal 614 at a low-potential side of the first input/output port 60a and the second input/output port 60c. The capacitor C2 is connected between a terminal 618 at a high-potential side of the third input/output port 60b and a terminal 620 at a low-potential side of the third input/output port 60b.

The capacitors C1, C2 and C3 may be disposed within the power source circuit 10, or they may be disposed outside the power source circuit 10.

The power source circuit 10 is an electric power conversion circuit including the primary conversion circuit 20 and the secondary conversion circuit 30. Additionally, the primary conversion circuit 20 and the secondary conversion circuit 30 are connected with each other through the primary magnetic coupling reactor 204, while they are magnetically coupled with each other by the transformer 400 (center tap transformer). The primary port composed of the first input/output port 60a and the second input/output port 60c and the secondary port composed of the third input/output port 60b are coupled through the transformer 400.

The primary conversion circuit 20 is a primary circuit including a primary full bridge circuit 200, the first input/output port 60a and the second input/output port 60c. The primary full bridge circuit 200 is a primary electronic power conversion unit including a primary coil 202 of the transformer 400, primary magnetic coupling reactor 204, a first primary upper arm U1, a first primary lower arm /U1, a second primary upper arm V1 and a second primary lower arm /V1. For example, the first primary upper arm U1, the first primary lower arm /U1, the second primary upper arm V1 and the second primary lower arm /V1 are switching elements respectively including a N channel MOSFET and a body diode that is a parasitic element of the MOSFET. Additional diodes may be connected in parallel with the MOSFET.

The primary full bridge circuit 200 includes a primary positive electrode bus 298 connected to the terminal 613 at a high-potential side of the first input/output port 60a and a primary negative electrode bus 299 connected to the terminal 614 at a low-potential side of the first input/output port 60a and the second input/output port 60c.

A first primary arm circuit 207 is connected between the primary positive electrode bus 298 and the primary negative electrode bus 299, where the first primary upper arm U1 and the first primary lower arm /U1 are connected in series in the first primary arm circuit 207. The first primary arm circuit 207 is a first primary electric power conversion circuit unit (U-phase primary electric power conversion circuit unit) capable of performing electric power conversion operations by performing switching on/off operations in the first primary upper arm U1 and the first primary lower arm /U1. Also, a second primary arm circuit 211 is connected between the primary positive electrode bus 298 and the primary negative electrode bus 299, where the second primary upper arm V1 and the second primary lower arm /V1 are connected in series in the second primary arm circuit 211. The second primary arm circuit 211 is connected in parallel with the first primary arm circuit 207. The second primary arm circuit 211 is a second primary electric power conversion circuit unit (V-phase primary electric power conversion circuit unit) capable of performing electric power conversion operation by performing switching on/off operations in the second primary upper arm V1 and the second primary lower arm /V1.

The primary coil 202 and the primary magnetic coupling reactor 204 are disposed at a bridge part for connecting a center point 207m of the first primary arm circuit 207 and a center point 211m of the second primary arm circuit 211. Here, connections in the bridge part are described in detail. One end of a first primary reactor 204a of the primary magnetic coupling reactor 204 is connected to the center point 207m of the first primary arm circuit 207. One end of the primary coil 202 is connected to the other end of the first primary reactor 204a. Also, one end of a second primary reactor 204b of the primary magnetic coupling reactor 204 is connected to the other end of the primary coil 202.

Further, the other end of the second primary reactor 204b is connected to the center point 211m of the second primary arm circuit 211. Additionally, the primary magnetic coupling reactor 204 includes the first primary reactor 204a and the second primary reactor 204b which is magnetically coupled with the first primary reactor 204a at a coupling coefficient $k_1$.

The center point 207m is a first primary intermediate node between the first primary upper arm U1 and the first primary lower arm /U1, while the center point 211m is a second primary intermediate node between the second primary upper arm V1 and the second primary lower arm /V1.

The first input/output port 60a is a port disposed between the primary positive electrode bus 298 and the primary negative electrode bus 299. The first input/output port 60a includes the terminal 613 and the terminal 614. The second input/output port 60c is a port disposed between the primary negative electrode bus 299 and the center tap 202m of the primary coil 202. The second input/output port 60c includes the terminal 614 and the terminal 616.

The port voltage Va at the first input/output port 60a and the port voltage Vc at the second input/output port 60c vary depending on the voltage of the primary low voltage system power source 62c.

The center tap 202m is connected to the terminal 616 at a high-potential side of the second input/output port 60c. The center tap 202m is an intermediate connection point of the first primary winding 202a and the second primary winding 202b included in the primary coil 202.

The secondary conversion circuit 30 is a secondary circuit including a secondary full bridge circuit 300 and the third input/output port 60b. The secondary full bridge circuit 300 is a secondary electric power conversion unit including the secondary coil 302 of the transformer 400, a secondary magnetic coupling reactor 304, a first secondary upper arm U2, a first secondary lower arm /U2, a second secondary upper arm V2, and a second secondary lower arm /V2. For example, the first secondary upper arm U2, the first secondary lower arm /U2, the second secondary upper arm V2 and the second secondary lower arm /V2 are switching elements respectively including N channel MOSFETs and body diodes that are a parasitic elements of the MOSFETs. Additional diodes may be connected in parallel with the MOSFET.

The secondary full bridge circuit 300 includes a secondary positive electrode bus 398 connected to the terminal 618 at a high-potential side of the third input/output port 60b and a secondary negative electrode bus 399 connected to the terminal 620 at a low-potential side of the third input/output port 60b.

A first secondary arm circuit 307 is connected between the secondary positive electrode bus 398 and the secondary negative electrode bus 399, where the first secondary upper arm U2 and the first secondary lower arm /U2 are connected in series in the first secondary arm circuit 307. The first secondary arm circuit 307 is a first secondary electric power conversion circuit unit (U-phase secondary electric power conversion circuit unit) capable of performing electric power conversion operation by performing switching on/off operations in the first secondary upper arm U2 and the first secondary lower arm /U2. A second secondary arm circuit 311 is connected between the secondary positive electrode bus 398 and the secondary negative electrode bus 399, where the second secondary upper arm V2 and the second secondary lower arm /V2 are connected in series in the second secondary arm circuit 311. The second secondary arm circuit 311 is connected in parallel with the first secondary arm circuit 307. The second secondary arm circuit 311 is a second electric power conversion circuit unit (V-phase secondary electric power conversion circuit unit) capable of performing an electric power conversion operation by performing switching on/off operations in the second secondary upper arm V2 and the second secondary lower arm /V2.

The secondary coil 302 and a secondary magnetic coupling reactor 304 are disposed at a bridge part for connecting a center point 307m of the first secondary arm circuit 307 and a center point 311m of the second secondary arm circuit 311. Here, connections in the bridge part are described in detail. One end of a first secondary reactor 304a of the secondary magnetic coupling reactor 304 is connected to the center point 307m of the first secondary arm circuit 307. One end of the secondary coil 302 is connected to the other end of the first secondary reactor 304a. The other end of the secondary coil 302 is connected to one end of a second secondary reactor 304b of the secondary magnetic coupling reactor 304. The other end of the second secondary reactor 304b is connected to the center point 311m of the second secondary arm circuit 311. Additionally, the secondary magnetic coupling reactor 304 includes the first secondary reactor 304a and the second secondary reactor 304b which is magnetically coupled with the first secondary reactor 304a at a coupling coefficient $k_2$.

The center point 307m is a first secondary intermediate node between the first secondary upper arm U2 and the first secondary lower arm /U2, while the center point 311m is a second secondary intermediate node between the second secondary upper arm V2 and the second secondary lower arm /V2.

The third input/output port 60b is a port disposed between the secondary positive electrode bus 398 and the secondary negative electrode bus 399. The third input/output port 60b includes a terminal 618 and a terminal 620.

The port voltage Vb at the third input/output port 60b varies depending on the voltage of the secondary high voltage system power source 62b.

The center tap 302m is an intermediate connection point of the first secondary winding 302a and the second secondary winding 302b included in the secondary coil 302.

In FIG. 1, the electric power apparatus 101 includes a sensor unit 70. The sensor unit 70 is a detecting unit for detecting an input/output value Y at a port in every certain detection period, where the port is at least one of the first input/output port 60a to the third input/output port 60b, thereby outputting the detection value Yd corresponding to the detected input/output value Y to the control unit 50. The detection value Yd may be a detected voltage of the input/output voltage, a detected current value of the input/output current, or a detected electric power of the input/output electric power. The sensor unit 70 may be disposed inside the power source circuit 10 or outside the power source circuit 10.

For example, the sensor unit 70 includes a voltage detecting unit for detecting the input/output voltage of at least one of the input/output ports 60a, 60c and 60b. For example, the sensor unit 70 includes a primary voltage detecting unit for outputting at least one of the input/output voltage Va and the input/output voltage Vc as the primary voltage detection value, and a secondary voltage detecting unit for outputting the input/output voltage Vb as the secondary voltage detection value.

For example, the voltage detecting units of the sensor unit 70 respectively includes a voltage sensor for monitoring the at least one input/output voltage of the input/output ports, and a voltage detecting circuit for outputting the detected voltage corresponding to the monitored input/output voltage to the control unit 50.

The electric power apparatus 101 includes a control unit 50. For example, the control unit 50 is an electronic circuit having a microcomputer including a CPU. The control unit 50 may be disposed inside the power source circuit 10 or outside the power source circuit 10.

The control unit 50 performs feedback-control of the electric power conversion operation performed in the power source circuit 10 by varying a value of a certain control parameter X, thereby adjusting the input/output value Y at the input/output ports 60a, 60c and 60b of the power source circuit 10. Two types of control variable, which are a phase difference $\phi$ and a duty ratio D ("on" state time $\delta$), are mainly exemplified as the control parameter X.

The phase difference $\phi$ indicates a shift between switching timings (time lag) in the primary full bridge circuit 200 and the secondary full bridge circuit 300. The duty ratio D indicates duty ratios ("on" state time $\delta$) in switching waveforms of the respective electric power conversion unit included in the primary full bridge circuit 200 and the secondary full bridge circuit 300.

These two control parameters X can be mutually independently controlled. The control unit 50 has the input/output value Y at the respective input/output ports of the power source circuit 10 vary by performing duty ratio control by using the duty ratio D ("on" state time $\delta$) or performing phase control by using the phase difference $\phi$ in the primary full bridge circuit 200 and the secondary full bridge circuit 300.

The control unit 50 preforms the feedback-control of the electric power conversion operation performed in the power source circuit 10 by varying the phase difference $\phi$ and the duty ratio D so that the detection value Vd corresponding to the input/output value Y at a port converges on a target value Yo set for the port, where the port is at least one of the first input/output port 60a to the third input/output port 60b. The target value Yo is an instruction value set by the control unit 50 or a certain device other than the control unit 50 based on driving conditions regulated load-by-load (for example, primary low voltage system load 61c, etc.) basis, the load being connected to the respective input/output ports. The target value Yo serves as an output target value when the electric power is output from the port, serves as an input target value when the electric power is input to the port, and it may be a target value of voltage, a target value of current or a target value of electric power.

Also, the control unit 50 preforms the feedback-control of the electric power conversion operation performed in the power source circuit 10 by varying the phase difference $\phi$ so that the electric power P transmitted between the primary conversion circuit 20 and the secondary conversion circuit 30 through the transformer 400 converges on a target value of the transmitted electric power set in advance. The transmitted electric power is also referred to as an electric power transmission amount. For example, the target value of the transmitted electric power is an instruction value set by the control unit 50 or a certain device other than the control unit 50 based on a deviation between the detection value Yd and the target value Yo at any one of the ports.

Figure 2:
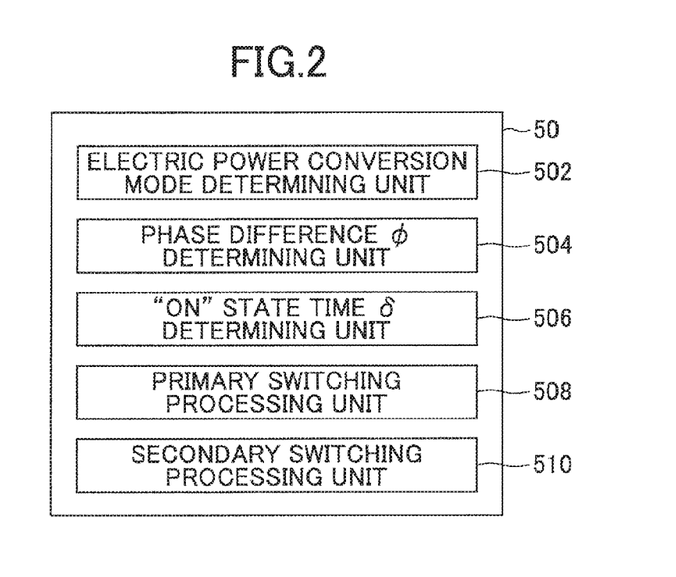
FIG. 2 is a block diagram for illustrating a control unit.

FIG. 2 is a block diagram for illustrating the control unit 50. The control unit 50 is a control unit for performing switching control of respective switching elements of the primary conversion circuit 20 such as the first primary arm U1 and of the secondary conversion circuit 30 such as first secondary arm U2. The control unit 50 includes an electric power conversion mode determining unit 502, a phase difference φ determining unit 504, a "on" state time δ determining unit 506, a primary switching processing unit 508 and a secondary switching processing unit 510. For example, the control unit 50 is an electronic circuit having a microcomputer including a CPU.

For example, the electric power conversion mode determining unit 502 determines to select an operational mode of the power source circuit 10 from electric power conversion modes A-F described below based on a certain external signal (for example, signal for indicating the deviation between the detection value Yd and the target value Yo at any one of the ports). The power conversion modes include a mode A in which the electric power input from the first input/output port 60*a* is converted to be output from the second input/output port 60*c* and a mode B in which the electric power input from the first input/output port 60*a* is converted to be output from the third input/output port 60*b*.

Also, the power conversion modes include a mode C in which the electric power input from the second input/output port 60*c* is converted to be output from the first input/output port 60*a* and a mode D in which the electric power input from the second input/output port 60*c* is converted to be output from the third input/output port 60*b*.

Further the power conversion modes include a mode E in which the electric power input from the third input/output port 60*b* is converted to be output from the first input/output port 60*a* and a mode F in which the electric power input from the third input/output port 60*b* is converted to be output from the second input/output port 60*c*.

The phase difference φ determining unit 504 has a function for determining the phase difference φ of switching cycle of the switching element in between the primary conversion circuit 20 and the secondary conversion circuit 30 so as to have the power source circuit 10 serve as a DC-DC converter circuit.

The "on" state time δ determining unit 506 has a function for setting the "on" state time δ of the switching elements in the primary conversion circuit 20 and the secondary conversion circuit 30 so as to have the primary conversion circuit 20 and the secondary conversion circuit 30 respectively serve as step-up/down circuits.

The primary switching processing unit 508 has a function for performing switching control of the respective switching elements included in the first primary upper arm U1, the first primary lower arm /U1, the second primary upper arm V1 and the second primary lower arm /V1 based on the output of the electric power conversion mode determining unit 502, the phase difference φ determining unit 504, and the "on" state time δ determining unit 506.

The secondary switching processing unit 510 has a function for performing switching control of the respective switching elements included in the first secondary upper arm U2, the first secondary lower arm /U2, the second secondary upper arm V2 and the second secondary lower arm /V2 based on the output of the electric power conversion mode determining unit 502, the phase difference φ determining unit 504, and the "on" state time δ determining unit 506.

The configuration of the control unit 50 shown in FIG. 2 is not a limiting example, and the control unit 50 may perform various processes required to control the electric power transmitted between the primary conversion circuit 20 and the secondary conversion circuit 30.

<Operations of Electric Power Apparatus>

Operations of the electric power apparatus 101 are described with reference to FIG. 1 and FIG. 2. For example, in a case where an external signal for requesting the power source circuit 10 to be operated in mode D of the electric power conversion mode is input, the electric power conversion mode determining unit 502 of the control unit 50 determines the electric power conversion mode of the power source circuit 10 to be mode D. In this case, the voltage input to the second input/output port 60*c* is stepped up by using a step-up function of the primary conversion circuit 20, and the electric power whose voltage is the stepped up voltage is transmitted to the third input/output port 60*b* by using a DC-DC converter circuit function of the power source circuit 10, thereby outputting it from the third input/output port 60*b*.

Here, the step-up function of the primary conversion circuit 20 is described in detail. As for the second input/output port 60*c* and the first input/output port 60*a*, the terminal 616 of the second input/output port 60*c* is connected to the first primary winding 202*a* and connected to the center point 207*m* of the first primary arm circuit 207 through the first primary reactor 204*a* which is connected in series with the first primary winding 202*a*. Also, a step-up/down circuit is disposed between the terminal 616 of the second input/output port 60*c* and the first input/output port 60*a* since both ends of the first primary arm circuit 207 are connected to the first input/output port 60*a*.

Further, the terminal 616 of the second input/output port 60*c* is connected to the second primary winding 202*b* and connected to the center point 211*m* of the second primary arm circuit 211 through the second primary reactor 204*b* which is connected in series with the second primary winding 202*b*. Thus, the step-up/down circuits are connected in parallel between the terminal 616 of the second input/output port 60*c* and the first input/output port 60*a* since both ends of the second primary arm circuit 211 are connected to the first input/output port 60*a*.

In the following, the DC-DC converter function of the power source circuit 10 is described in detail. As for the first input/output port 60*a* and the third input/output port 60*b*, the primary full bridge circuit 200 is connected to the first input/output port 60*a* and the secondary full bridge circuit 300 is connected to the third input/output port 60*b*. By magnetically coupling the primary coil 202 included in the primary full bridge circuit 200 with a secondary coil 302 included in the secondary full bridge circuit 300 at a coupling coefficient $k_T$, the transformer 400 serves as a the center tap transformer whose turn ratio is 1:N. Therefore, the electric power input from the first input/output port 60*a* can be converted to be transmitted to the third input/output port 60*b* or the electric power input from the third input/output port 60*b* can be converted to be transmitted to the first input/output port 60*a*, by adjusting the phase difference φ of a switching cycle of the switching elements in the primary full bridge circuit 200 and the secondary full bridge circuit 300.

Figure 3:
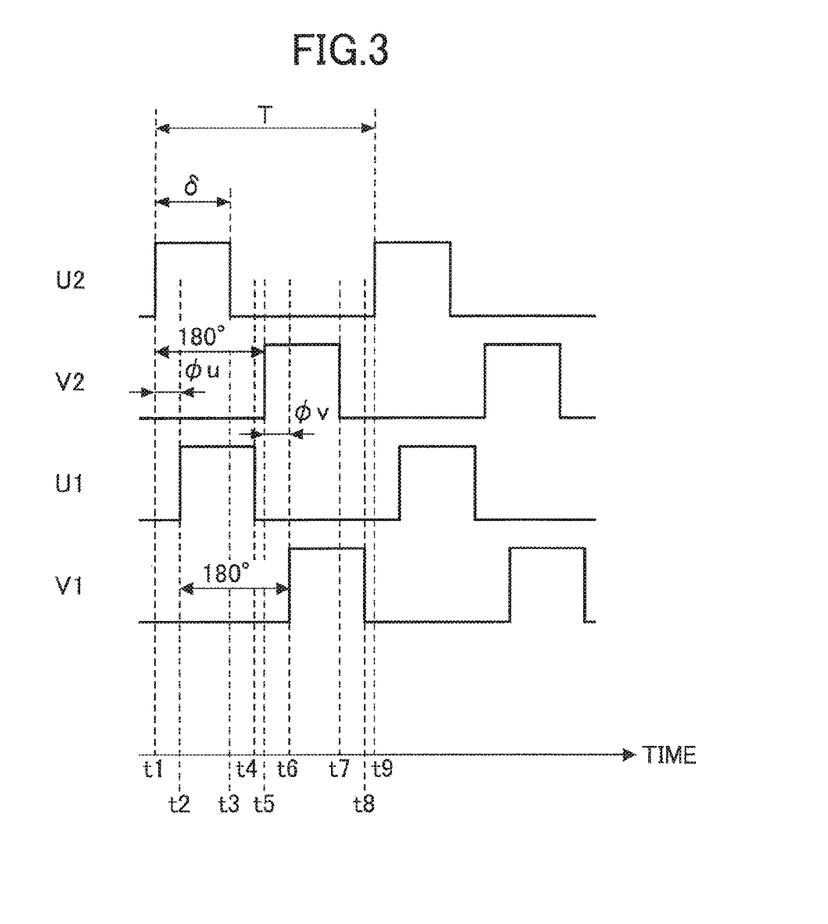
FIG. 3 is a timing diagram for illustrating switching on/off waveforms in a primary circuit and in a secondary circuit.

FIG. 3 is a timing diagram for illustrating switching on/off waveforms, controlled by the control unit 50, in the respective arms included in the power source circuit 10. In FIG. 3, "U1" shows an on/off waveform in the first primary upper arm U1, "V1" shows an on/off waveform in the second primary upper arm V1, "U2" shows an on/off waveform in the first secondary upper arm U2, and "V2" shows an on/off waveform in the second secondary upper arm V2. On/off waveforms in the first primary lower arm /U1, the second primary lower arm /V1, the first secondary lower arm /U2 and the second secondary lower arm /V2 are respectively inverted waveforms of the on/off waveforms in the first primary upper arm U1, the second primary upper arm V1, the first secondary upper arm U2 and the second secondary upper arm V2 (not shown). Additionally, a dead time may be prepared between the respective waveforms in the upper arm and the lower arm so as to prevent flow through current caused by turning on both the upper arm and the lower arm. Also, in the waveforms shown in FIG. 3, high level corresponds to a state of "on", while low level corresponds to a state of "off".

Here, step-up/down ratios of the primary conversion circuit 20 and the secondary conversion circuit 30 can be changed by changing respective "on" state times δ of "U1", "U2", "V1" and "V2". For example, by mutually conforming the respective "on" state times δ of "U1", "U2", "V1" and "V2", the step-up/down ratios of the primary conversion circuit 20 and the secondary conversion circuit 30 can be equal to each other.

The "on" state time δ determining unit 506 sets the respective "on" state times δ of "U1", "U2", "V1" and "V2" to conform to each other (the respective "on" state times 5=primary "on" state times δ11=secondary "on" state times δ12=time value β) so that the step-up/down ratios of the primary conversion circuit 20 and the secondary conversion circuit 30 become equal to each other.

The step-up/down ratio of the primary conversion circuit 20 is determined by the duty ratio D which is a ratio by the "on" state time δ to a switching period T of the switching elements (arm) in the primary full bridge circuit 200. Similarly, the step-up/down ratio of the secondary conversion circuit 30 is determined by the duty ratio D which is a ratio by the "on" state time δ to a switching period T of the switching elements (arm) in the secondary full bridge circuit 300. The step-up/down ratio of the primary conversion circuit 20 is a voltage transformation ratio between the first input/output port 60a and the second input/output port 60c, while the step-up/down ratio of the secondary conversion circuit 30 is a voltage transformation ratio between the third input/output port 60b and a fourth input/output port 60d.

Therefore, for example, the following expression can be formed.

step-up/down ratio of the primary conversion circuit 20=(voltage at the second input/output port 60c)/(voltage at the first input/output port 60a)=δ11/T=β/T step-up/down ratio of the secondary conversion circuit 30=(voltage at the fourth input/output port 60d)/(voltage at the third input/output port 60b)=δ12/T=β/T That is, the step-up/down ratio of the primary conversion circuit 20 is equal to the step-up/down ratio of the secondary conversion circuit 30.

Additionally, the "on" state time δ shown in FIG. 3 indicates the "on" state time δ11 in the first primary upper arm U1 and the second primary upper arm V1, as well as the "on" state time δ12 in the first secondary upper arm U2 and the second secondary upper arm V2. Also, the switching period T of the arms included in the primary full bridge circuit 200 is the same as the switching period T of the arms included in the secondary full bridge circuit 300.

Also, the respective waveforms of "U1" and "V1" have a phase difference of 180 degrees (π), and "U2" and "V2" have a phase difference of 180 degrees (n). Further, the electric power P transmitted between the primary conversion circuit 20 and the secondary conversion circuit 30 can be adjusted by changing the phase difference φ. The electric power is transmitted from the primary conversion circuit 20 to the secondary conversion circuit 30 when the phase difference φ is greater than 0, while the electric power is transmitted from the secondary conversion circuit 30 to the primary conversion circuit 20 when the phase difference φ is less than 0.

The phase difference φ indicates a shift between switching timings (time lag) in the primary full bridge circuit 200 and the secondary full bridge circuit 300. For example, the phase difference φ indicates a shift between switching timings in the first primary arm circuit 207 and the first secondary arm circuit 307 as well as a shift between switching timings in the second primary arm circuit 211 and the second secondary arm circuit 311. The shifts are controlled to be equal to each other. That is, the phase difference φ between "U1" and "U2" is controlled to be equal to the phase difference φ between "V1" and "V2".

For example, in a case where the external signal for requesting the power source circuit 10 to be operated in the mode F of the electric power conversion mode is input, the electric power conversion mode determining unit 502 determines to select the mode F. Then, the "on" state time δ determining unit 506 sets the "on" state time δ for defining the step-up ratio of the primary conversion circuit 20 which serves as a step-up circuit for stepping up the voltage input to the second input/output port 60c to output it from the first input/output port 60a. Additionally, the secondary conversion circuit 30 serves as a step-down circuit for stepping down the voltage input to the third input/output port 60b with the step-down ratio defined by the "on" state time δ which has been set by the "on" state time δ determining unit 506. Further, the phase difference φ determining unit 504 sets the phase difference φ for transmitting the electric power input at the first input/output port 60a being converted into desired electric power P to the third input/output port 60b.

The primary switching processing unit 508 controls the respective switching elements in the first primary upper arm U1, the first primary lower arm /U1, the second primary upper arm V1 and the second primary lower arm /V1 so that the primary conversion circuit 20 serves as the step-up circuit and as a part pf the DC-DC converter circuit.

The secondary switching processing unit 510 controls the respective switching elements in the first secondary upper arm U2, the first secondary lower arm /U2, the second secondary upper arm V2 and the second secondary lower arm /V2 so that the secondary conversion circuit 30 serves as the step-down circuit and as a part of the DC-DC converter circuit.

As described above, the primary conversion circuit 20 and the secondary conversion circuit 30 can serve as the step-up circuit or the step-down circuit, and the power source circuit 10 can serve as a bidirectional DC-DC converter circuit. Therefore, the electric power conversion operation can be performed in any of the modes A-F of the electric power conversion mode. In other words the electric power can be converted between two input/output ports selected from the three input/output ports.

The transmitted electric power P (also referred to as transmitted electric power amount P) adjusted by the control unit 50 with the phase difference φ, an equivalent inductance L, etc., is electric power transmitted from one of the primary conversion circuit 20 and the secondary conversion circuit 30 to the other through the transformer 400, and it is expressed by formula (1) shown below.

$$P=(N \times Va \times Vb)/(\pi \times \omega \times L) \times F(D,\phi) \tag{1}$$

Wherein, "N" indicates turn ratio of the transformer 400, "Va" indicates the input/output voltage at the first input/output port 60a (the voltage between the primary positive electrode bus 298 and the primary negative electrode bus 299 of the primary conversion circuit 20), and "Vb" indicates the input/output voltage at the third input/output port 60b (the voltage between the secondary positive electrode bus 398 and the secondary negative electrode bus 399 of the secondary conversion circuit 30). "n" indicates the circumference ratio, and co (=2π×f=2π/T) indicates an angular frequency of the switching in the primary conversion circuit 20 and the secondary conversion circuit 30. "f" indicates a switching frequency in the primary conversion circuit 20 and the secondary conversion circuit 30, "T" indicates a switching period in the primary conversion circuit 20 and the secondary conversion circuit 30, and "L" indicates the equivalent inductance related to the electric power transmission of the magnetic coupling reactors 204 and 304 and the transformer 400. "F(D,ϕ)" indicates a function with the duty ratio D and the phase difference ϕ as its parameters, while it is a variable which monotonically increases as the phase difference ϕ increases without depending on the duty ratio D. The duty ratio D and the phase difference ϕ are control parameters designed to vary within a range between the predetermined upper limit value and the predetermined lower limit value.

The equivalent inductance L can be defined in a simple equivalent circuit of the transformer 400 in which the primary magnetic coupling reactor 204 and the secondary magnetic coupling reactor 304 are connected. The equivalent inductance L is a combined inductance of a leakage inductance of the primary magnetic coupling reactor 204 and/or a leakage inductance of the secondary magnetic coupling reactor 304 and a leakage inductance of the transformer 400.

For example, the equivalent inductance L (secondary side equivalent value $L_{EQ2}$) measured through the secondary conversion circuit 30 can be expressed by formula (2) shown below.

$$L_{EQ2}=2L_1(1-k_1)N^2+2L_2(1-k_2)+L_{T2}(1-k_T^2) \quad (2)$$

Wherein, "$L_1$" indicates a self-inductance of the primary magnetic coupling reactor 204, "$k_1$" indicates coupling coefficient of the primary magnetic coupling reactor 204, "N" indicates turn ratio of the transformer 400, "$L_2$" indicates a self-inductance of the secondary magnetic coupling reactor 304, "$k_2$" indicates coupling coefficient of the secondary magnetic coupling reactor 304, "$L_{T2}$" indicates an excitation inductance of the transformer 400, and "$k_T$" indicates coupling coefficient of the transformer 400. Additionally, in a case where the second input/output port 60c or the fourth input/output port 60d is not used, the leakage inductance expressed by the first term or the second term in formula (2) may be omitted.

By the way, the coupling coefficients $k_1$, $k_2$ and $k_T$ or the self-inductance widely disperse in the electric power apparatus 101 since dimension tolerances of the core members or wound coils included in the transformer 400 or the magnetic coupling reactors 204 and 304 are relatively large. Especially, after the wound coil has been assembled, the dispersion of the coupling coefficients $k_1$, $k_2$ and $k_T$ or the self-inductance become significant due to the stress and distortion. Consequently, a dispersion of the equivalent inductance L becomes greater, which causes a dispersion of transmitted electric power P.

As shown in formula (1), the transmitted electric power P depends on the phase difference ϕ and the equivalent inductance L. For example, the transmitted electric power P becomes smaller as the equivalent inductance L becomes greater, while the transmitted electric power P becomes greater as the equivalent inductance L becomes smaller. Therefore, the transmitted electric power P can be controlled by appropriately adjusting the phase difference ϕ, the equivalent inductance L, etc., as a control parameter.

<Flowchart of Operation of Electric Power Apparatus 101>

Figure 4:
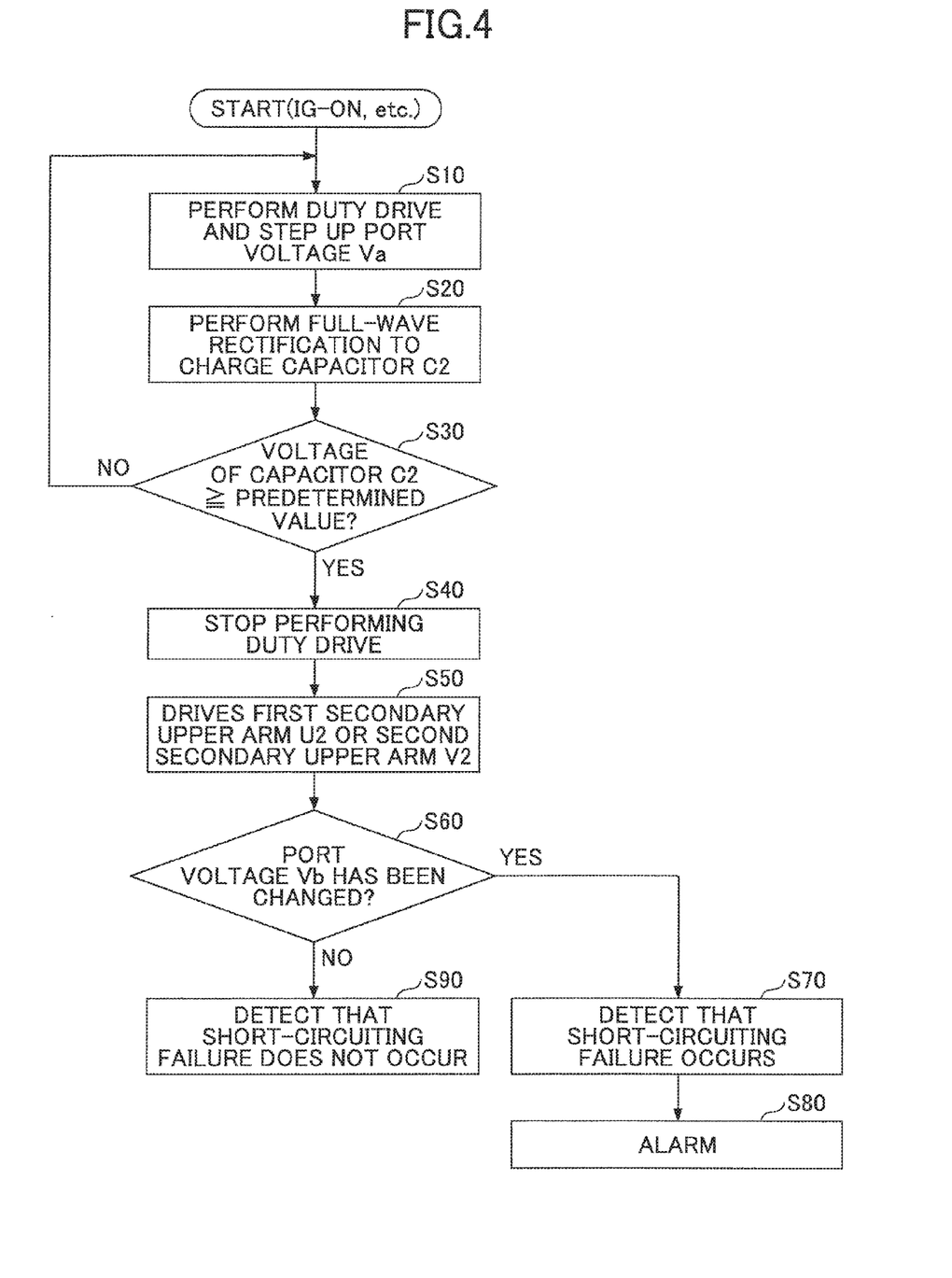
FIG. 4 is a flowchart for illustrating an example method for detecting presence or absence of a short-circuiting failure in the electric power conversion apparatus.

FIG. 4 is a flowchart for illustrating an example method for detecting presence or absence of a short-circuiting failure in the secondary conversion circuit 30 (the first secondary lower arm /U2, the second secondary lower arm /V2, etc.,) when starting the electric power apparatus 101. For example, the method shown in FIG. 4 is performed by the control unit 50.

In step S10, the control unit 50 performs a duty drive on the primary conversion circuit 20 (the first primary upper arm U1, the first primary lower arm /U1, the second primary upper arm V1 and the second primary lower arm /V1) to step up the port voltage Va upon ignition-on (IG-ON), and the like. "IG-ON" means to turn on the ignition switch in order to have the vehicle be in a state capable of travelling.

In step S20, the control unit 50 has the secondary conversion circuit 30 perform a full-wave rectification to charge the capacitor C2. In this case, the control unit 50 may have the second secondary upper arm V2 and the first secondary upper arm U2 be in a half-on state so as to prevent rush current.

In step S30, the control unit 50 determines whether the voltage of the capacitor C2 is greater than or equal to the predetermined value. In a case where the voltage of the capacitor C2 is determined to be greater than or equal to the predetermined value (YES in step S30), the process is proceeded to step S40. In a case where the voltage of the capacitor C2 is determined to be less than the predetermined value (NO in step S30), the process is returned to step S10. The predetermined value may be determined according to a maintenance standard of road transportation vehicles, etc., and, for example, it may be greater than or equal to 56 V and equal to or less than 60 V (safe voltage without requiring insulation).

In step S40, the control unit 50 stops performing the duty drive on the primary conversion circuit 20.

In step S50, the control unit 50 drives the first secondary upper arm U2 or the second secondary upper arm V2.

In step S60, the control unit 50 determines presence or absence of the change in the port voltage Vb. In a case where the port voltage Vb has been changed (YES in step S60), the process is proceeded to step S70. In a case where the port voltage Vb has not been changed (NO in step S60), the process is proceeded to step S90.

Figure 5A:
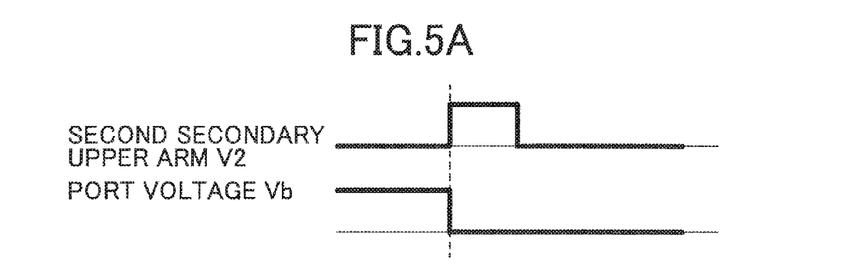
FIG. 5A is a timing diagram for illustrating an example operation of the electric power conversion apparatus.

In a case where the port voltage Vb has been changed, the control unit 50 can determine which arm of the first primary lower arm /U2 and the second secondary lower arm /V2 has the short-circuiting failure based on a manner of the change. For example, as shown in FIG. 5A, in a case where the port voltage Vb immediately changes upon the second secondary upper arm V2 being turned from off to on, the control unit 50 can determine that the short-circuiting failure occurs in the second secondary lower arm /V2. Also, for example, as shown in FIG. 5B, in a case where the port voltage Vb gradually changes upon the second secondary upper arm V2 being turned from off to on, the control unit 50 can determine that the short-circuiting failure occurs in the first secondary lower arm /U2.

Figure 5B:
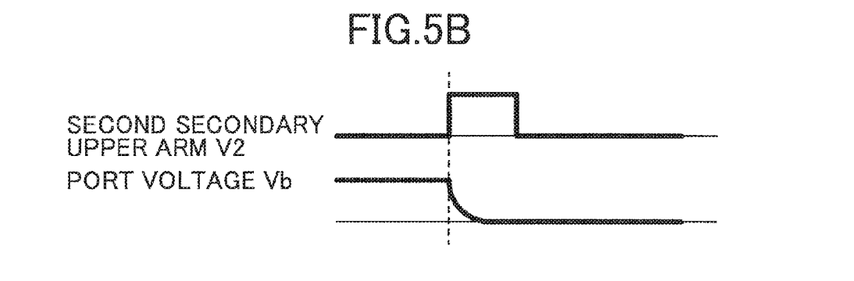
FIG. 5B is a timing diagram for illustrating another example operation of the electric power conversion apparatus.

Additionally, in FIG. 5B, the port voltage Vb gradually changes because of an inductance component between the phases. A threshold value for determination may be theoretically or empirically found. The threshold value (or a condition) for determination may be that the port voltage Vb is reduced to a value equal to or less than the half thereof when 100 ns passes after turning on the second secondary upper arm V2.

In step S70, the control unit 50 detects that the short-circuiting failure occurs in the first secondary lower arm /U2 or the second secondary lower arm /V2. Therefore, the control unit 50 does not allow the electric power apparatus 101 to be started in a normal state.

In step S80, the control unit 50 reports an alarm to another ECU, a driver, or the like.

In step S90, the control unit 50 detects that short-circuiting failure does not occur in the first secondary lower arm /U2 and the second secondary lower arm /V2. Therefore, the control unit 50 allows the electric power apparatus 101 to be started in a normal state.

As described above, the control unit 50 supplies low electric power whose voltage level is considered to be safe from the auxiliary battery to the capacitor at high-voltage side, thereby detecting the short-circuiting failure in the lower arm at high-voltage side based on the voltage change at the high-voltage side port when driving the arm at high voltage side. Thus, failures in apparatus caused by flow of through current in the high-voltage side circuit, etc., can be prevented, thereby enabling the vehicle to be safely started. Also, the workload and cost can be reduced since dedicated circuits such as a detection circuit or a precharge circuit are not required.

<Timing Diagram and Direction and Path of Current>

Figure 6:
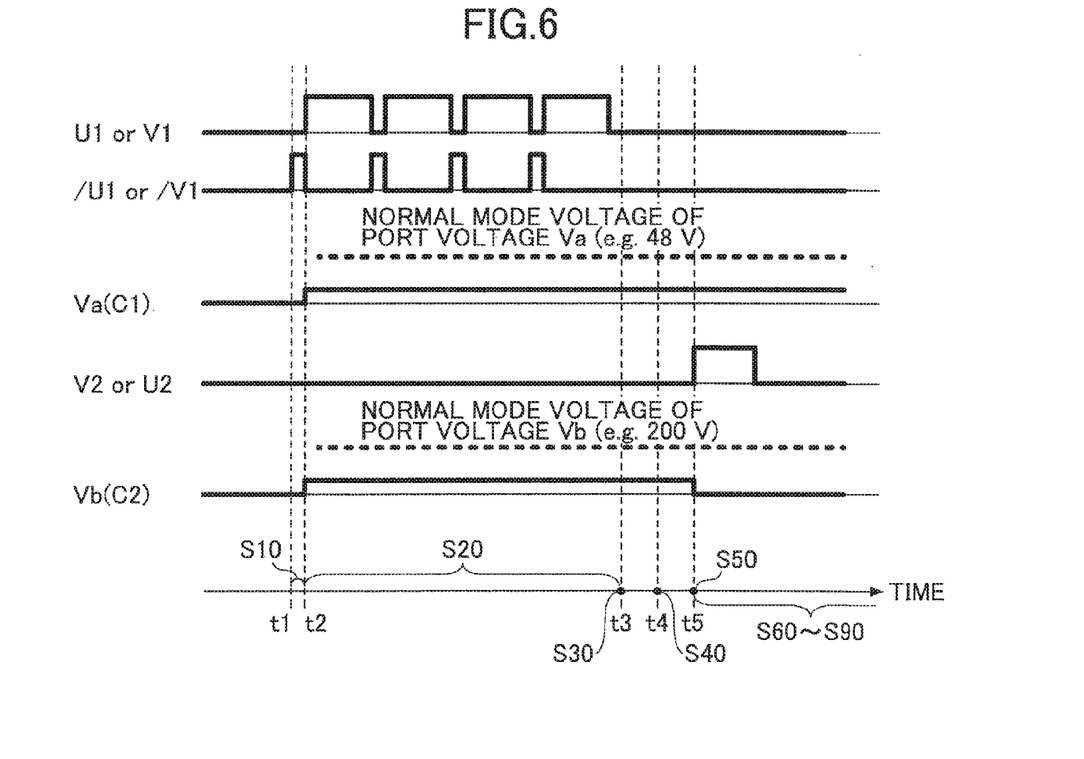
FIG. 6 is an example timing diagram corresponding to the method for detecting the failure.

FIG. 6 is an example timing diagram corresponding to the method for detecting the failure shown in FIG. 4. In FIG. 6, "S10", "S20", "S30", "S40", "S50", "S60", "S70", "S80", and "S90" show respective timings at which the steps S10, S20, S30, S40, S50, S60, S70, S80 and S90 shown in FIG. 4 are performed. Also, in FIG. 6, pulse waveforms of U1, /U1, etc., show on/off wave forms of the respective arms, and waveforms of Va (C1) and Vb (C2) show respective voltage wave forms of the port voltage Va and the port voltage Vb. The port voltage Va is a voltage at the first input/output port 60a and equal to the voltage across the capacitor C1. The port voltage Vb is a voltage at the third input/output port 60b and equal to the voltage across the capacitor C2.

Figure 7:
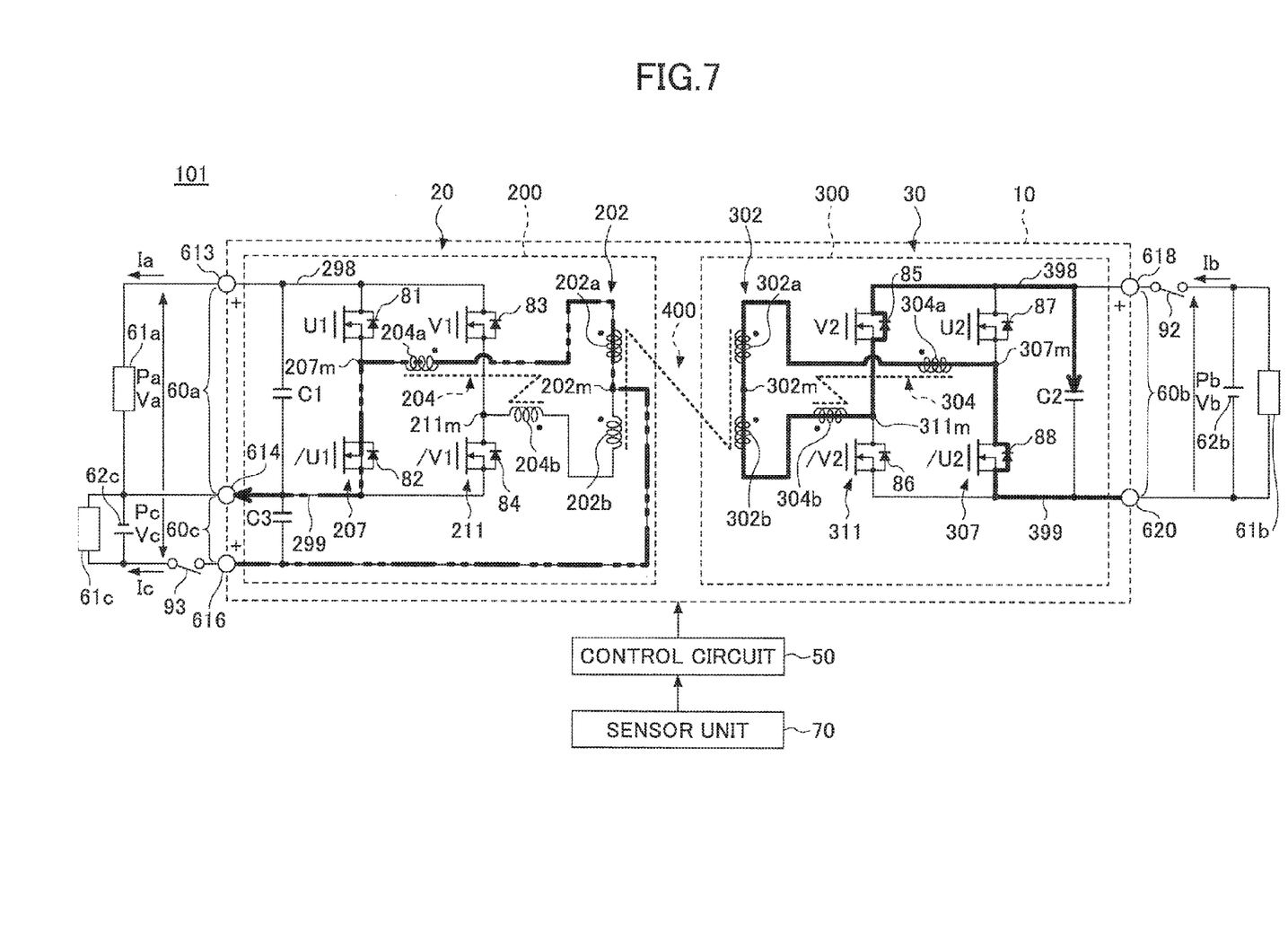
FIG. 7 is an example diagram for illustrating a direction and a path of the charge current.
Figure 8:
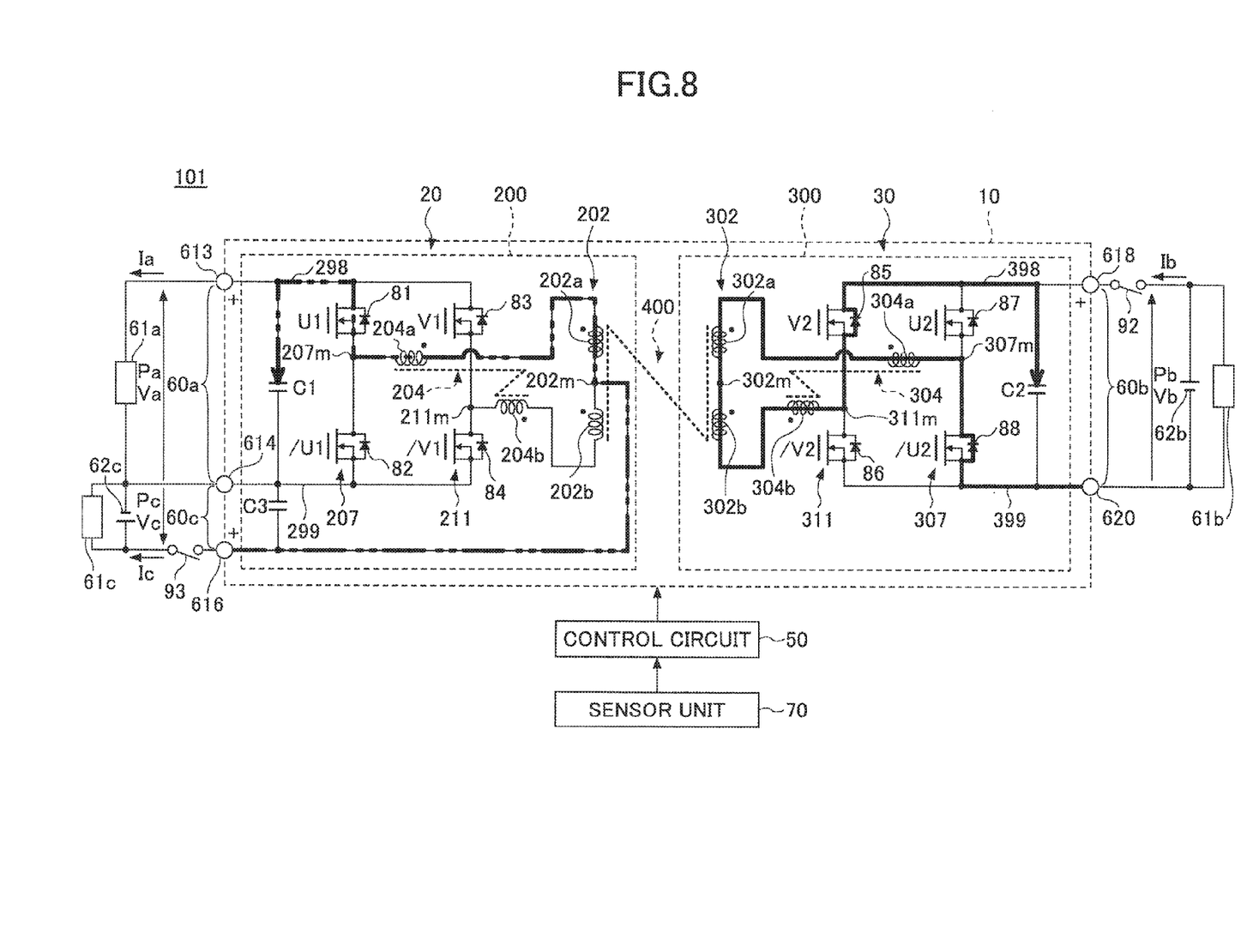
FIG. 8 is another example diagram for illustrating a direction and a path of the charge current.
Figure 9:
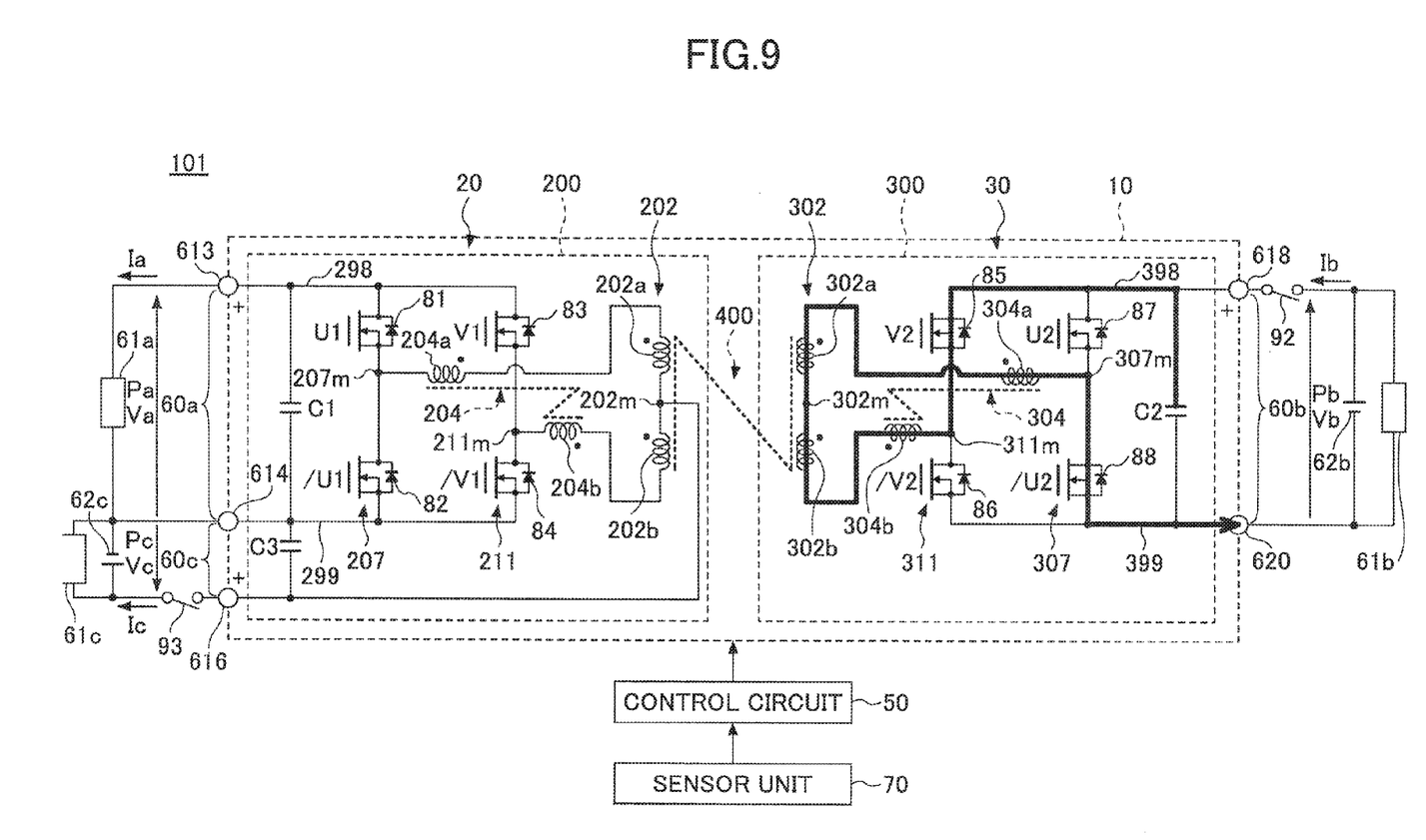
FIG. 9 is an example diagram for illustrating a direction and a path of the discharge current.

FIG. 7 is a diagram for illustrating a direction and a path of the charge current of the capacitor C2 during a period from a timing t1 to a timing t4 shown in FIG. 6, wherein the first primary lower arm /U1 is turned on. FIG. 8 is a diagram for illustrating a direction and a path of the charge current of the capacitor C2 during a period from a timing t1 to the timing t4 shown in FIG. 6, wherein the first primary upper arm U1 is turned on. FIG. 9 is a diagram for illustrating a direction and a path of the discharge current after a timing t5 shown in FIG. 6, wherein a short-circuiting failure occurs in the first secondary lower arm /U2, and the second secondary upper arm V2 is turned on.

During a period from the timing t1 to a timing t2 (step S10) shown in FIG. 6, the control unit 50 performs a duty drive on the first primary upper arm U1, the first primary lower arm /U1, the second primary upper arm V1 and the second primary lower arm /V1 to step up the port voltage Va. For example, in a case where the first primary lower arm /U1 is turned on, as shown by an arrow in left side of FIG. 7, the input electric power Pc input from the primary low voltage system power source 62c at the second input/output port 60c is supplied to the first input/output port 60a through the center tap 202m, the first primary winding 202a, the first primary reactor 204a and the first primary lower arm /U1. Also, for example, in a case where the first primary upper arm U1 is turned on, as shown by an arrow in left side of FIG. 8, the input electric power Pc input from the primary low voltage system power source 62c at the second input/output port 60c is supplied to the capacitor C1 through the center tap 202m, the first primary winding 202a, the first primary reactor 204a and the first primary upper arm U1.

The step-up ratio can be reduced by setting an on-duty in the first primary upper arm U1 and the second primary upper arm V1 to be long while setting an on-duty in the first primary lower arm /U1 and the second primary lower arm /V1 to be short. For example, in a case where the port voltage Vc=12 V, the on-duty ratio of the upper arm is set to be 25% in a normal state, which allows the port voltage Va to rise up to 48 V, while the on-duty ratio of the upper arm is set to be 85% upon the failure being detected, which allows the port voltage Va to rise up to 14 V, thus, the step-up ratio can be reduced (see Va in FIG. 6). Additionally, a 12 V battery is permanently connected to the second input/output port 60c.

During a period from the timing t2 to the timing t4 (step S20) shown in FIG. 6, the control unit 50 performs a full-wave rectification (diode bridge by parasitic diode) with the second secondary upper arm V2 and the first secondary upper arm U2 to charge the capacitor C2. As shown by an arrow in right side of FIG. 7 and FIG. 8, the transformer 400 is excited to cause AC current flow through the secondary conversion circuit 30, thereby charging the capacitor C2 connected to the third input/output port 60b.

The port voltage Vb is defined by the turn ratio (1:N) of the transformer 400. For example, in a case where the turn ratio is 1:4, the port voltage Va=48 V is converted with the ratio 1:4 to be the port voltage Vb=200 V in a normal state, while the port voltage Va=14 V is converted with the ratio 1:4 to be the port voltage Vb=56 V (safe voltage) upon the failure being detected (see Vb in FIG. 6).

At the timing t3 (step S30) shown in FIG. 6, the control unit 50 checks whether the capacitor C2 is charged as expected (for example, whether the voltage across the capacitor C2 is greater than 56 V), that is, the voltage across the capacitor C2 (port voltage Vb) is measured to be compared with a predetermined value. Thus, the control unit 50 can check whether the voltage across the capacitor C2 is a safe voltage.

At the timing t4 (step S40) shown in FIG. 6, the control unit 50 turns off the first primary upper arm U1, the first primary lower arm /U1, the second primary upper arm V1 and the second primary lower arm /V1, after determining that the voltage across the capacitor C2 is greater than or equal to the predetermined value.

At the timing t5 (step S50) shown in FIG. 6, the control unit 50 turns on the first secondary upper arm U2 and the second secondary upper arm V2.

After the timing t5 (step S60) shown in FIG. 6, the control unit 50 checks presence or absence of change in the port voltage Vb, thereby detecting whether the short-circuiting failure occurs in the first secondary lower arm /U2 or in the second secondary lower arm /V2.

After the timing t5 (step S70, and step S80) shown in FIG. 6, in a case where the short-circuiting failure occurs in the first secondary lower arm /U2 or in the second secondary lower arm /V2, the control unit 50 does not allow the electric power apparatus 101 to be normally started, and reports an alarm in a case where the short-circuiting failure occurs (port voltage Vb=0). For example, the control unit 50 reports the short-circuiting failure in the first secondary lower arm /U2 (see FIG. 5B) in a case where the current flows from the capacitor C2 to the third input/output port 60b through the second secondary upper arm V2 and the first secondary lower arm /U2 (the port voltage Vb gradually becomes close to 0 V) as shown by an arrow in FIG. 9.

After the timing t5 (step S90) shown in FIG. 6, the control unit 50 allows the electric power apparatus 101 to be started normally in a case where the short-circuiting failure does not occur in the first secondary lower arm /U2 and in the second secondary lower arm /V2.

Herein above, although the subject matter has been described with respect to specific embodiments, the appended claims are not to be thus limited. It should be understood that the various changes, substitutions, and alterations could be made hereto without departing from the spirit and scope of the claims. Further, all or part of the components of the embodiments described above can be combined.

For example, in the description above, the MOSFET, which is a semiconductor element capable of performing on/off operations, has been exemplified as the switching element. However, for example, the switching elements may be voltage control type power elements with insulated gates such as IGBT or MOSFET, or may be bipolar transistors.

Also, the present technology can be applied to an electric power conversion apparatus including three or more input/output ports and capable of converting the electric power between any two input/output ports among the three or more input/output ports. For example, the present technology can be applied to an electric power apparatus which includes another input/output port in addition to the three input/output ports shown in FIG. 1.

What is claimed is:

1. An electric power conversion method of an electric power conversion apparatus, the electric power conversion apparatus including a primary port provided in a primary circuit, and a secondary port provided in a secondary circuit which is magnetically coupled with the primary circuit through a transformer, the secondary circuit including a first secondary upper arm, a second secondary upper arm, a first secondary lower arm, a second secondary lower arm and a capacitor, wherein electric power to be transmitted between the primary circuit and the secondary circuit is adjusted by changing a phase difference between a switching cycle in the primary circuit and a switching cycle in the secondary circuit, the electric power conversion method comprising:
    charging the capacitor by transmitting the electric power from the primary circuit to the secondary circuit; and
    determining whether a voltage across the capacitor is equal to or greater than a predetermined value;
    the electric power conversion method further comprising, upon determining that the voltage across the capacitor is greater than or equal to the predetermined value,
    stopping driving the primary circuit;
    driving the first secondary upper arm or the second secondary upper arm; and
    detecting whether a short-circuiting failure occurs in the first secondary lower arm or in the second secondary lower arm based on a presence or absence of change in a voltage at the secondary port in response to driving the first secondary upper arm or the second secondary upper arm.

2. The electric power conversion method as claimed in claim 1, further comprising:
    detecting the short-circuiting failure in the first secondary lower arm or the second secondary lower arm upon determining the voltage at the secondary port has changed; and
    reporting an alarm in response to detecting the short-circuiting failure.

3. The electric power conversion method as claimed in claim 1, further comprising:
    detecting absence of the short-circuiting failure in the first secondary lower arm and the second secondary lower arm upon determining the voltage at the secondary port has not changed.

4. The electric power conversion method as claimed in claim 1, wherein the predetermined value is 60 V.

5. An electric power conversion method of an electric power conversion apparatus, the electric power conversion apparatus including a primary port provided in a primary circuit, and a secondary port provided in a secondary circuit which is magnetically coupled with the primary circuit through a transformer, the secondary circuit including a first secondary upper arm, a second secondary upper arm, a first secondary lower arm, a second secondary lower arm and a capacitor, wherein electric power to be transmitted between the primary circuit and the secondary circuit is adjusted by changing a phase difference between a switching cycle in the primary circuit and a switching cycle in the secondary circuit, the electric power conversion method comprising:
    stepping up a voltage at the primary port;
    charging the capacitor; and
    determining whether a voltage across the capacitor is greater than or equal to a predetermined value;
    the electric power conversion method further comprising, upon determining that the voltage across the capacitor is greater than or equal to the predetermined value,
    stopping driving the primary circuit;
    driving the first secondary upper arm or the second secondary upper arm; and
    detecting whether a short-circuiting failure occurs in the first secondary lower arm or in the second secondary lower arm based on a presence or absence of change in a voltage at the secondary port in response to driving the first secondary upper arm or the second secondary upper arm.

6. The electric power conversion method as claimed in claim 5, further comprising:
    detecting the short-circuiting failure in the first secondary lower arm or the second secondary lower arm upon determining the voltage at the secondary port has changed; and
    reporting an alarm in response to detecting the short-circuiting failure.

7. The electric power conversion method as claimed in claim 5, further comprising:
    detecting absence of the short-circuiting failure in the first secondary lower arm and the second secondary lower arm upon determining the voltage at the secondary port has not changed.

8. The electric power conversion method as claimed in claim 5, wherein the predetermined value is 60 V.

9. An electric power conversion apparatus comprising:
    a primary circuit including a primary port;
    a secondary circuit magnetically coupled with the primary circuit through a transformer, the secondary circuit including a first secondary upper arm, a second secondary upper arm, a first secondary lower arm, a second secondary lower arm, a capacitor and a secondary port; and
    a control unit configured to control electric power transmitted between the primary circuit and the secondary circuit by changing a phase difference between a switching cycle in the primary circuit and a switching cycle in the secondary circuit; wherein the control unit is configured to:

(i) charge the capacitor by transmitting the electric power from the primary circuit to the secondary circuit, (ii) determine whether a voltage across the capacitor is greater than or equal to a predetermined value, and (iii) upon determining that the voltage across the capacitor is greater than or equal to a predetermined value, perform the processes of stopping driving the primary circuit, driving the first secondary upper arm or the second secondary upper arm, and detecting whether a short-circuiting failure occurs in the first secondary lower arm or in the second secondary lower arm based on a presence or absence of change in a voltage at the secondary port in response to driving the first secondary upper arm or the second secondary upper arm.

10. The electric power conversion apparatus as claimed in claim 9, wherein the control unit detects the short-circuiting failure in the first secondary lower arm or the second secondary lower arm upon determining the voltage at the secondary port has changed and reports an alarm in response to detecting the short-circuiting failure.

11. The electric power conversion apparatus as claimed in claim 9, wherein the control unit detects absence of the short-circuiting failure in the first secondary lower arm and the second secondary lower arm upon determining the voltage at the secondary port has not changed.

12. The electric power conversion apparatus as claimed in claim 9, wherein the predetermined value is 60 V.

13. An electric power conversion apparatus comprising:

a primary circuit including a primary port;

a secondary circuit magnetically coupled with the primary circuit through a transformer, the secondary circuit including a first secondary upper arm, a second secondary upper arm, a first secondary lower arm, a second secondary lower arm, a capacitor and a secondary port; and a control unit configured to control electric power transmitted between the primary circuit and the secondary circuit by changing a phase difference between a switching cycle in the primary circuit and a switching cycle in the secondary circuit; wherein the control unit is configured to:

(i) step up an voltage at the primary port, (ii) charge the capacitor, (iii) determine whether a voltage across the capacitor is greater than or equal to a predetermined value, and (iv) upon determining that the voltage across the capacitor is greater than or equal to a predetermined value, perform the processes of stopping driving the primary circuit, driving the first secondary upper arm or the second secondary upper arm, and detecting whether a short-circuiting failure occurs in the first secondary lower arm or in the second secondary lower arm based on a presence or absence of change in a voltage at the secondary port in response to driving the first secondary upper arm or the second secondary upper arm.

14. The electric power conversion apparatus as claimed in claim 13, wherein the control unit detects the short-circuiting failure in the first secondary lower arm or the second secondary lower arm upon determining the voltage at the secondary port has changed and reports an alarm in response to detecting the short-circuiting failure.

15. The electric power conversion apparatus as claimed in claim 13, wherein the control unit detects absence of the short-circuiting failure in the first secondary lower arm and the second secondary lower arm upon determining the voltage at the secondary port has not changed.

16. The electric power conversion apparatus as claimed in claim 13, wherein the predetermined value is 60 V.

* * * * *